UNITED STATES PATENT OFFICE.

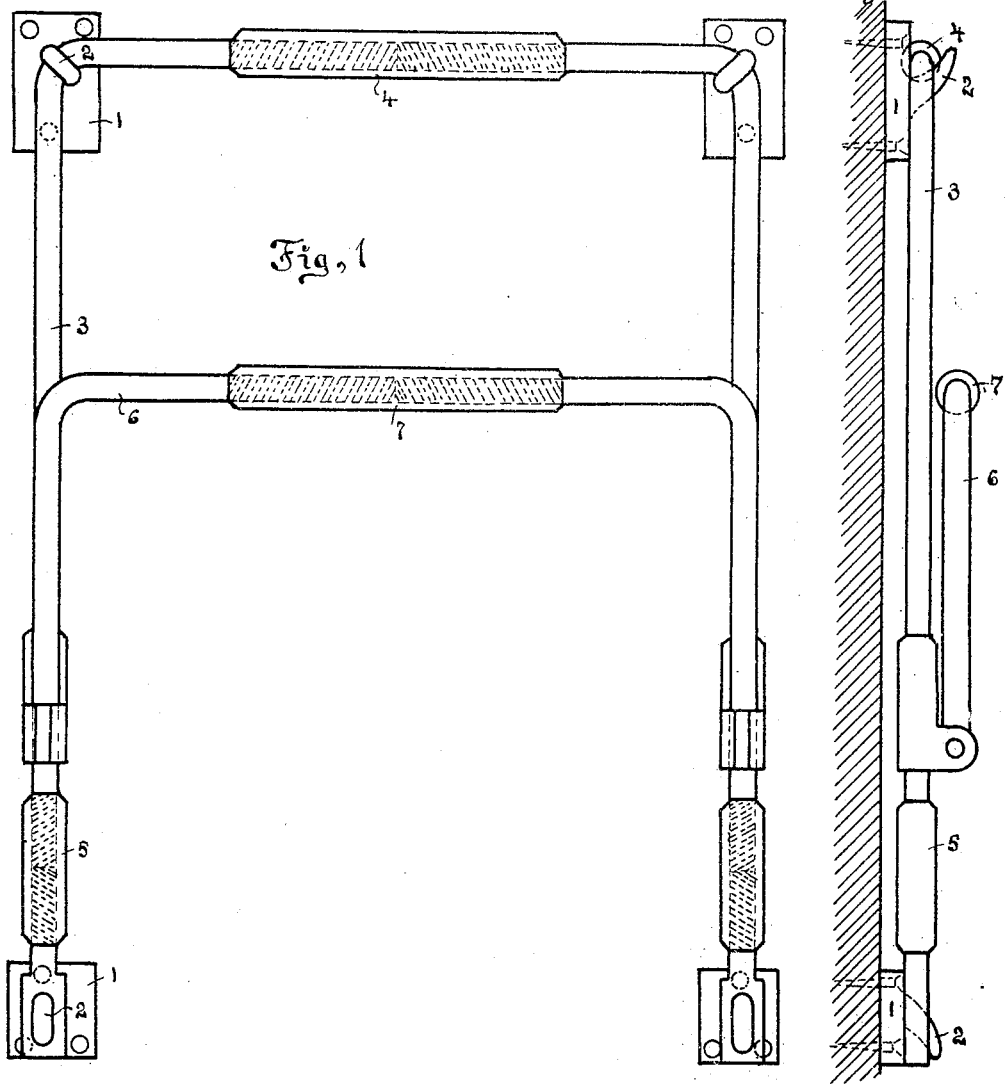

OSKAR ÖSTRÖM, OF HERSERUD, LIDINGÖ, SWEDEN.

FASTENING DEVICE FOR AWNINGS.

1,376,351.　　　　　Specification of Letters Patent.　　Patented Apr. 26, 1921.

Application filed August 5, 1920. Serial No. 401,512.

*To all whom it may concern:*

Be it known that I, OSKAR ÖSTRÖM, teacher, and a subject of the King of Sweden, residing at Herserud, Lidingö, in the Kingdom of Sweden, have invented certain new and useful Improvements in Fastening Devices for Awnings; and I do declare the following to be a full, clear, and exact description of the invention, such as will enable others skilled in the art to which it appertains to make and use the same.

The present invention relates to a fastening device for awnings and is characterized essentially by the fact that a ⋂-shaped clamp fixed to the wall is at its upper corners suspended on hooks fixed on mountings which are secured to the wall by screws while the lower ends of the clamp are provided with recesses with which other hooks fixed to mountings in the wall engage; that the vertical and horizontal parts of the clamp are divided and are held together by screw casings, which, when screwed up, tighten the clamp around the said hooks; and that also the horizontal part of the clamp for the actual awning is divided, and that these likewise are held together by a screw casing, so that the awning clamp can be adjusted to the same breadth as the clamp which is fixed to the wall or to the window-sill.

A mode of the invention selected by way of example is illustrated in the drawing, where Figure 1 shows the device in front view, and Fig. 2 in side view.

1 designates the mountings in which the hooks 2 are fixed. To the lower hooks 2′ the lower ends of the clamp 3 are fixed by being threaded through recesses therein, while the clamp 3 with its upper corners rests against the upper hooks 2. The horizontal part of the clamp is divided, the parts being held together by a screw casing 4 (Fig. 1), and the vertical parts are also divided, the latter parts being likewise held together by screw casings 5. When the screw casings 4 and 5 are tightened, the clamp 3 is firmly jammed around the hooks 2, so that the clamp is securely held against the latter. The horizontal part of the clamp for the actual awning is likewise divided, the parts being held together by a screw casing 7, by means of which the breadth of the clamp 6 is adjusted according to the breadth of the clamp 3.

An arrangement in accordance with the present invention greatly facilitates the erection and taking down of the awning, as this is effected simply by tightening or unscrewing the screw casings.

What I do claim as my invention and desire to secure by Letters Patent is:

1. An awning fastener comprising an inverted U-shaped clamp the arms of which are extensible and provided with adjusting means and also provided with slots near their lower ends, downturned attaching hooks engaged in said slots, upturned attaching hooks engaged in the angles between the intermediate portion and the arms of said clamp, and a second inverted U-shaped clamp having its arms pivotally connected at their lower ends to the arms of said first named clamp.

2. An awning fastener comprising an inverted U-shaped clamp the arms of which are extensible and provided with adjusting means and also provided with slots near their lower ends, downturned attaching hooks engaged in said slots, upturned attaching hooks engaged in the angles between the intermediate portion and the arms of said clamp, and a second inverted U-shaped clamp having its arms pivotally connected at their lower ends to the arms of said first named clamp, each of said clamps being longitudinally extensible and having adjusting means.

In testimony whereof I have affixed my signature in presence of two witnesses.

OSKAR ÖSTRÖM.

Witnesses:
H. F. VHERPEN,
LUMER NOLIN.